UNITED STATES PATENT OFFICE 2,693,472
Patented Nov. 2, 1954

2,693,472

POLYMETHINE COMPOUNDS

John David Kendall and Harold Gordon Suggate, Ilford, England, assignors to Ilford Limited, Ilford, England, a British company No Drawing. Application March 12, 1951,
Serial No. 215,194

Claims priority, application Great Britain March 20, 1950

4 Claims. (Cl. 260—304)

This invention relates to polymethine compounds and in particular to polymethine heterocyclic cyanoesters and dinitriles having alkylthio or alkoxy substituents in the polymethine chain. The said compounds are optical sensitisers for silver halide photographic emulsions and the present invention includes the new compounds, processes for their production and silver halide photographic emulsions containing them.

According to the present invention new polymethine heterocyclic compounds conform to the general formula I:

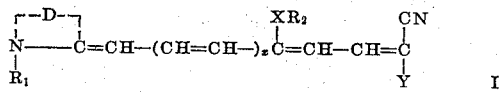

where $R_1$ is an alkyl or aralkyl group, $R_2$ is an alkyl or aralkyl group, D is the residue of a substituted or unsubstituted thiazole, oxazole or selenazole nucleus, X is an oxygen atom or a sulphur atom, Y is a —CN group or a —COOR$_3$ group (where $R_3$ is alkyl or aralkyl), and $x$ is nought or 1.

Further, according to this invention the said compounds of Formula I are prepared by condensing a compound of the general formula II:

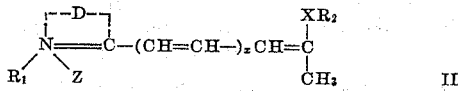

where Z is an acid radicle and the other symbols have the meanings assigned to them above, with a compound of the general Formula III:

where $R_4$ is an alkyl or aralkyl group and Y has the meaning assigned to it above, in the presence of a strong organic base selected from the class consisting of strong secondary and tertiary organic bases or inorganic bases.

The reaction goes very readily on heating the reactants together. Preferably the base used is triethylamine or, where an inorganic base is required, is selected from sodium and potassium acetates, carbonates and alkoxides.

In the foregoing formulae $R_1$, $R_2$, $R_3$ and $R_4$ may be the same or different and may be alkyl or aralkyl groups, e. g. methyl, ethyl, propyl, butyl and higher alkyl groups or benzyl groups. The residue D may be selected from the residues of thiazoles, oxazoles, selenazoles and their polycyclic homologues such as those of the benzene, naphthalene, acenaphthene and anthracene series.

The following examples will serve to illustrate the invention, but are not to be regarded as limiting it in any way:

EXAMPLE 1

Preparation of ethyl 6-[3'-methyl-2':3'-dihydrobenzthiazolylidene - 2'] - 5 - methoxy - 2 - cyano - 2:4-hexadienoate 2-acetylmethylene-3-methyl 2:3 dihydrobenzthiazole (20.5 gm.) and methyl p-toluene sulphonate (18.6 gm.) were fused on a water bath for 4 hours. Alcohol (150 cc.) and ethoxymethylenecyanacetic ethyl ester (16.9 gm.) were then added, the mixture warmed to obtain complete solution and triethylamine (14 cc.) run in. Red dye crystals precipitated out of solution as the mixture was refluxed for 30 minutes. The flask was cooled and the contents filtered. The red solid obtained was extracted with ether and recrystallised from methyl alcohol in which it was sparingly soluble. The product consisted of red crystals, M. Pt. 198° C.

Incorporated in a gelatino silver iodobromide photographic emulsion it imparted a band of sensitivity extending to 580 m$\mu$ with a maximum at 540 m$\mu$.

EXAMPLE 2

Preparation of ethyl 6-[3' - ethyl - 2':3' - dihydro - 4':5'-benzbenzthiazolylidene - 2'] - 5 - ethoxy - 2 - cyano-2:4 hexadienoate 2 - acetylmethylene - 3 - ethyl - 2:3 - dihydro - β-naphthathiazole (6.7 gm.) and ethyl p-toluene sulphonate (7.5 gm.) were fused together at 130–140° C. for 4 hours with occasional shaking. Alcohol (100 cc.) and ethoxymethylenecyanacetic ethyl ester (8.5 gm.) were added and the mixture warmed until a clear solution was obtained. Triethylamine (7 cc.) was added, the mixture refluxed on the water bath for an hour and poured into a solution of potassium iodide (20 gm.) in water (400 cc.). An oil which crystallised separated from the solution. It was extracted with benzene, the extract concentrated in vacuo and cooled, when the dye separated. It was recrystallised from ethyl alcohol as orange-red crystals with a green reflex, M. Pt. 210° C.

Incorporated in a gelatino silver iodobromide photographic emulsion it imparted a band of sensitivity extending to 620 m$\mu$ with a maximum at 590 m$\mu$.

EXAMPLE 3

Preparation of ethyl 6-[3'-ethyl-2':3'-dihydrobenzthiazolylidene-2']-5-ethoxy-2-cyano-2:4-hexadienoate 2 - acetylmethylene - 3 - ethyl - 2:3 - dihydrobenzthiazole (10.9 gm.) and ethyl p-toluene sulphonate (12 gm.) were fused at 130–140° C. for 3½ hours with occasional shaking. Alcohol (200 cc.) and ethoxymethylenecyanacetic ethyl ester (85 gm.) were added and the mixture warmed until a clear solution was obtained. Triethylamine (14 cc.) was then added, the mixture refluxed on the water bath for 1 hour, and poured into a solution of potassium iodide (20 gm.) in water (400 cc.). The crystals formed were filtered off and washed with a little water. The dyestuff was extracted with benzene, the benzene partially removed in vacuo and the solution well cooled, when the dyestuff separated. It was recrystallised from ethyl alcohol as dark red crystals, M. Pt. 231° C.

Incorporated in a gelatino silver iodobromide photographic emulsion it imparted a band of sensitivity extending to 580 m$\mu$ with a maximum at 540 m$\mu$.

EXAMPLE 4

Preparation of ethyl 6-[3'-ethyl-2':3'-dihydrobenzthiazolylidene-2']5-methoxy-2-cyano-2:4-hexadienoate 2 - acetylmethylene - 3 - ethyl-2:3-dihydrobenzthiazole (10.9 gm.) and methyl p-toluene sulphonate (11 gm.) were fused together on the water bath for 4 hours with occasional shaking. Alcohol (200 cc.) and ethoxymethylenecyanacetic ethyl ester (8.5 gm.) are added and the mixture warmed until a clear solution was obtained. Triethylamine (14 cc.) was added and the mixture refluxed on the water bath for one hour. On pouring into a solution of potassium iodide (20 gm.) in water (400 cc.) the dyestuff precipitated. It was then filtered, extracted with benzene and the extract concentrated in vacuo and cooled. The dyestuff which separated was crystallised from ethyl alcohol as dark-red crystals, M. Pt. 227° C.

Incorporated in a gelatino silver iodobromide photographic emulsion it imparted a band of sensitivity extending to 570 m$\mu$ with a maximum at 540 m$\mu$.

EXAMPLE 5

Preparation of 5-[3'-methyl-2':3'-dihydrobenzthiazolylidene-2']-4-methoxy 1:1-dicyano 1:3-pentadiene 2-acetylmethylene - 3 - methyl-2:3-dihydrobenzthiazole (10.2 gm.) and methyl p-toluene sulphonate (14 gm.) were fused together on the steam bath for 3½ hours with occasional shaking. The resulting solid was dissolved in ethyl alcohol (200 cc.) by gently heating and ethoxymethylenemalonitrile (9.5 gm.) was added. Triethylamine (14 cc.) was added to the clear solution and the mixture was refluxed on the steam bath for an hour. The semi-solid mixture was poured into a solution of potassium iodide (20 gm.) in 500 cc. water, the precipitated dyestuff filtered and washed with a little water. After drying the dyestuff was extracted with benzene. On cooling the extract, crystals separated and were filtered off. These were further purified by crystallisation from ethyl alcohol and obtained as dark red crystals, M. Pt. 236° C.

Incorporated in a gelatino silver iodobromide photographic emulsion it imparted a band of sensitivity extending to 630 m$\mu$ with maxima at 500 m$\mu$ and 550 m$\mu$.

EXAMPLE 6

*Preparation of 5-[3'-methyl - 2':3' - dihydro-4':5' - benzbenzthiazolylidene-2']-4-ethoxy-1:1-dicyano-1:3-pentadiene*

2-acetylmethylene - 3 - ethyl 2:3-dihydro-$\beta$-naphthathiazole (6.7 gm.) and ethyl p-toluene sulphonate (7.5 gm.) were fused together at 120-130° C. for 4 hours with occasional shaking. The resulting mass was dissolved in ethyl alcohol (100 cc.) by warming on the steam bath, and ethoxymethylenemalonitrile (6 gm.) was then added. Triethylamine (7 cc.) was added to the solution which was refluxed on the steam bath for an hour. The semi-solid mixture was stirred into a solution of potassium iodide (20 gm.) in 400 cc. water. The precipitated dye was filtered off, washed with a little water, dried and extracted with benzene. The extract was cooled and the precipitated dye filtered off. The dye was further purified by crystallisation from ethyl alcohol and thus obtained as dark red crystals, M. Pt. 267° C.

Incorporated in a gelatino silver iodobromide photographic emulsion it imparted a band of sensitivity extending to 580 m$\mu$ with a maximum at 560 m$\mu$.

EXAMPLE 7

*Preparation of 5-[3'-methyl-2':3-dihydrobenzthiazolylidene-2']-4-ethoxy-1:1-dicyano 1:3-pentadiene*

2-acetylmethylene - 3 - methyl-2:3-dihydrobenzthiazole (10.2 gm.) and ethyl p-toluene sulphonate (15 gm.) were fused together on the steam bath for 5 hours. The resulting mass was dissolved in alcohol (200 cc.) by warming on the steam bath and ethoxymethylenemalonitrile (9.5 gm.) was added. Triethylamine (14 cc.) was added to the solution and the mixture gently refluxed for an hour. Upon pouring the semi-solid mass into a solution of potassium iodide (20 gm.) in 400 cc. water, a dyestuff was precipitated. It was filtered, and washed with a little water. The dried crystals were extracted with benzene and the extract cooled to precipitate the dye. The dye was further purified by recrystallisation from ethyl alcohol and thus obtained as red crystals with a blue reflex, M. Pt. 243 C.

Incorporated in a gelatino silver iodobromide photographic emulsion it imparted a band of sensitivity extending to 580 m$\mu$ with a maximum at 540 m$\mu$.

EXAMPLE 8

*Preparation of 5-[3'-ethyl - 2':3' - dihydrobenzthiazolylidene-2']-4-ethoxy-1:1-dicyano-1:3-pentadiene*

2-acetylmethylene - 3 - ethyl-2:3 - dihydrobenzthiazole (10.9 gm.) and ethyl p-toluene sulphonate (12 gm.) were fused together at 120-130° C. for 3½ hours with occasional shaking. The resulting solid was dissolved in alcohol (200 cc.) and ethoxymethylenemalonitrile (6.1 gm.) was added. Triethylamine (14 cc.) was added to the clear solution which was then refluxed gently for 1 hour and poured into a solution of potassium iodide (20 gm.) in 400 cc. water. The precipitated dyestuff was filtered off and washed with a little water. The dye was extracted with benzene and the extract well cooled to precipitate the dyestuff which was further purified by recrystallisation from ethyl alcohol and thus obtained as orange-red crystals, M. Pt. 251° C.

Incorporated in a gelatino silver iodobromide photographic emulsion it imparted a band of sensitivity extending to 580 m$\mu$ with a maximum at 540 m$\mu$.

EXAMPLE 9

*Preparation of 5-[3'-ethyl - 2':3' - dihydrobenzthiazolylidene-2']-4-methoxy-1:1-dicyano-1:3-pentadiene*

2-acetylmethylene - 3 - ethyl-2:3'-dihydrobenzthiazole 10.9 gm.) and methyl p-toluene sulphonate (11 gm.) were fused together on the steam bath for 4 hours with occasional shaking. The resulting solid was taken up in ethyl alcohol (200 cc.) and ethoxymethylenemalonitrile (6.1 gm.) was added. Triethylamine (14 cc.) was added to the clear solution which was then refluxed for one hour and poured into a solution of potassium iodide (20 gm.) in 400 cc. water. The precipitated dyestuff was filtered off, washed with a little water, extracted with benzene and the extract cooled to precipitate the dye. It was purified by recrystallisation from ethyl alcohol and thus obtained as orange-red crystals, M. Pt. 233° C.

Incorporated in a gelatino silver iodobromide photographic emulsion it imparted a band of sensitivity extending to 580 m$\mu$ with a maximum at 550 m$\mu$.

EXAMPLE 10

*Preparation of 5-[3'-methyl-2':3'-dihydrobenzthiazolylidene-2']-4-ethylthio-1:1-dicyano-1:3-pentadiene*

2-($\omega$-ethylthio-$\omega$-methyl) vinyl benzthiazole methiodide (18.8 gm.), ethyl alcohol (750 cc.) and ethoxymethylenemalonitrile (7 gm.) were heated under reflux on a steam bath for 15 minutes. Triethylamine (8 cc.) was added to the suspension, which was then shaken. A clear solution was obtained which was refluxed for 30 minutes on a steam bath. On cooling, a precipitate was obtained, and this was filtered and washed with a little alcohol. A further small amount of solid was obtained on diluting the mother liquors with water. The separated solid was extracted with benzene, the benzene extract concentrated, and the dyestuff which separated was recrystallised from ethyl alcohol in which it was sparingly soluble. It was thus obtained as deep crimson crystals, M. Pt. 196° C.

Incorporated in a gelatino silver iodobromide photographic emulsion it imparted a band of sensitivity extending to 660 m$\mu$ with a maximum at 620 m$\mu$.

EXAMPLE 11

*Preparation of ethyl 6-[3'-methyl-2':3'-dihydrobenzthiazolylidene-2']-5-ethylthio-2-cyano-2:4-hexadienoate*

2-($\omega$-ethylthio-$\omega$-methyl-vinyl benzthiazole methiodide (18.8 gm.), ethyl alcohol (750 cc.) and ethoxymethylenecyanacetic ethyl ester were heated under reflux on a steam bath for 15 minutes. Triethylamine (8 cc.) was added to the suspension, the contents of the flask being shaken after the addition. The solution was then refluxed on a steam bath for 30 minutes. On cooling, a precipitate was obtained which was filtered and washed with a little alcohol. The separated solid was then extracted with benzene and the benzene extract concentrated. The dyestuff thus obtained was recrystallised from ethyl alcohol and obtained as deep red crystals, M. Pt. 128° C.

Incorporated in a gelatino silver iodobromide photographic emulsion it imparted a band of sensitivity extending to 680 m$\mu$ with a maximum at 620 m$\mu$.

EXAMPLE 12

*Preparation of ethyl 6-[3'-methyl-2':3'-dihydro-5':6'-benzbenzthiazolylidene - 2']-5 - ethylthio-2-cyano-2:4-hexadienoate*

2($\omega$-ethylthio-$\omega$-methyl) vinyl $\alpha$-naphthathiazole methochloride (17 gm.), ethyl alcohol (150 cc.) and ethoxymethylene cyanacetic ethyl ester (8.5 gm.) were refluxed together to dissolve. Triethylamine (14 cc.) was then run in with agitation and the mixture refluxed for 30 minutes. It was then poured into a solution of potassium iodide (20 gm.) in water (200 cc.). The purple precipitate was filtered off, washed with water and alcohol and dried. The product was then extracted in a Soxhlet extractor with benzene and the benzene removed from the extract. The product obtained was recrystallised from methyl alcohol (1 gm. in 100 cc.) to obtain the pure material as purple rhombs, M. Pt. 222° (d).

Incorporated in a gelatino silver iodobromide photographic emulsion it imparted a band of sensitivity extending to 6800 Å. with a maximum at 6600 Å.

EXAMPLE 13

*Preparation of ethyl 6-[3'-ethyl-2:3'-dihydro-4':5'-benzbenzthiazolylidene-2']-5-ethylthio-2-cyano -2:4- hexadienoate*

2-(ω-ethylthio-ω-methyl) vinyl β-naphthathiazole ethochloride (20 gm.), ethyl alcohol (200 cc.) and ethoxymethylene cyanacetic ethyl ester (10 gm.) were refluxed together to dissolve. Triethylamine (17 cc.) was then slowly run in and the mixture refluxed for 30 minutes. The solution was then poured into a solution of potassium iodide (20 gm.) in water (200 cc.) and the precipitate filtered off and washed with water and alcohol. The product was extracted with benzene in a Soxhlet extractor and the benzene removed from the extracts. The crystals obtained were recrystallised from methyl alcohol (1 gm. in 100 cc.), yielding the product as purple crystals with a reddish reflex, M. Pt. 165–166° (d).

Incorporated in a gelatino silver iodobromide photographic emulsion it imparted a band of sensitivity extending to 6800 Å. with a maximum at 6200 Å.

EXAMPLE 14

*Preparation of ethyl 6-[3'-methyl-2':3'-dihydro-5':6'-dimethoxy benzthiazolylidene-2']-5-ethylthio - 2 - cyano-2:4-hexadienoate*

2-(ω-ethylthio-ω-methyl) vinyl-5:6-dimethoxy benzthiazole methochloride (17.5 gm.), ethyl alcohol (300 cc.) and ethoxymethylene cyanacetic ethyl ester (9 gm.) were refluxed together to dissolve. On solution, triethylamine (14 cc.) was slowly run in with agitation and the liquor refluxed 30 minutes. On cooling, pouring into water and filtering, a product consisting of dark blue crystals was obtained. These were washed with a little alcohol and water and dried. After subjecting to extraction with benzene and removal of benzene from the extract, dark blue crystals were obtained. This product was recrystallised from methyl alcohol (1 gm. in 30 cc.), yielding dark crystals with a green reflex, M. Pt. 191° C.

Incorporated in a gelatino silver iodobromide photographic emulsion it imparted a band of sensitivity extending to 6800 Å. with a maximum at 6200 Å.

EXAMPLE 15

*Preparation of ethyl 6-[3'-ethyl-2':3'-dihydrobenzthiazolylidene-2']-5-ethylthio-2-cyano-2:4-hexadienoate*

2-(ω-ethylthio-ω-methyl) vinyl benzthiazole ethochloride (17 gm.), ethyl alcohol (200 cc.) and ethoxy methylene cyanacetic ethyl ester were warmed together to dissolve and on complete solution triethylamine (16 cc.) was added in 2 cc. portions with hand agitation. The mixture was refluxed 30 minutes and then poured in water. The precipitate was filtered, washed with a little water and alcohol and dried. This product was extracted with benzene and the extract evaporated to dryness. The purple crystals obtained were recrystallised from methyl alcohol (1 gm. in 20 cc.), M. Pt. 145°.

Incorporated in a gelatino silver iodobromide photographic emulsion it imparted a band of sensitivity extending to 6800 Å. with a maximum at 6350 Å.

EXAMPLE 16

*Preparation of 5-[3'-methyl-2':3'-dihydro-5':6'-benzbenzthiazolylidene-2'] - 4 - ethylthio - 1:1 - dicyano-1:3-pentadiene*

2 - (ω - ethylthio - ω-methyl) vinyl-α-naphthathiazole methochloride (17 gm.), ethyl alcohol (150 cc.) and ethoxymethylene malonitrile (6 gm.) were refluxed to dissolve. Triethylamine (14 cc.) was then slowly run in with agitation and the mixture refluxed 30 minutes. On pouring into a solution of potassium iodide (20 gm.) in water (400 cc.), a dark blue precipitate was obtained which was filtered off, washed with water and alcohol and dried. The product was extracted with benzene, the benzene removed from the extract, and dark purple crystals thus obtained. Recrystallisation from methyl alcohol (1 gm. in 100 cc.) indicated that the dye was very insoluble. The product, consisting of dark crystals with a reddish reflex, had M. Pt. 193–195° (d).

Incorporated in a gelatino silver iodobromide photographic emulsion it imparted a band of sensitivity extending to 6800 Å. with a maximum at 6600 Å.

EXAMPLE 17

*Preparation of 5-[3'-ethyl-2':3'-dihydro-4':5'-benzbenzthiazolylidene - 2'] - 4 - ethylthio - 1:1 - dicyano-1:3-pentadiene*

2 - (ω - ethylthio - ω - methyl) vinyl-β-naphthathiazole ethochloride (17.5 gm.), ethyl alcohol (150 cc.) and ethoxymethylene malonitrile (6 gm.) were refluxed to dissolve. On solution triethylamine (14 cc.) was slowly run in with some hand agitation. The mixture was refluxed for 30 minutes and then poured into a solution of potassium iodide (20 gm.) in water (400 cc.). The dark precipitate was filtered off, washed with water and a little alcohol and dried. It was extracted with benzene, the benzene removed and the product recrystallised in methyl alcohol (1 gm. in 50 cc.) to give dark green crystals, M. Pt. 203° (d).

Incorporated in a gelatino silver iodobromide photographic emulsion it imparted a band of sensitivity extending to 6800 Å with a maximum at 6400 Å.

EXAMPLE 18

*Preparation of 5-[3'-methyl-5':6'-dimethoxy-2':3'-dihydrobenzthiazolylidene - 2'] - 4 - ethylthio - 1:1 - dicyano-1:3-pentadiene*

2 - (ω - ethylthio - ω - methyl) vinyl - 5:6 - dimethoxy benzthiazole methochloride (17.5 gm.), ethyl alcohol (300 cc.) and ethoxymethylene malonitrile (6 gm.) were refluxed together to dissolve. On solution, triethylamine (14 cc.) was slowly run in in portions and the mixture refluxed 30 minutes. The deep blue solution was cooled and poured into water (400 cc.). The green crystals obtained were filtered and washed with alcohol and water and dried. This product was extracted with benzene, the benzene removed from the extract and the product thus obtained as dark crystals having a green reflex. After boiling out with methyl alcohol they had M. Pt. 225° (d).

Incorporated in a gelatino silver iodobromide photographic emulsion it imparted a band of sensitivity extending to 6900 Å. with a maximum at 6350 A.

EXAMPLE 19

*Preparation of 5-[3'-ethyl-2':3'-dihydrobenzthiazolylidene-2']-4-ethylthio-1:1-dicyano-1:3-pentadiene*

2 - (ω - ethylthio - ω - methyl) vinyl benzthiazole ethochloride (13 gm.), ethyl alcohol (200 cc.) and ethoxymethylene malonitrile (6.1 gm.) were refluxed to dissolve. Triethylamine (14 cc.) was then added in 2 cc. portions with shaking. On pouring into water a purple crystalline solid was precipitated which was filtered off and washed with alcohol and water. This solid was dried and extracted with benzene, the benzene being afterwards removed from the extract. On recrystallisation from methyl alcohol (1 gm. in 20 cc.) a purple crystalline solid was obtained, M. Pt. 163° C.

Incorporated in a gelatino silver iodobromide photographic emulsion it imparted a band of sensitivity extending to 6900 Å. with a maximum at 6400 Å.

EXAMPLE 20

*Preparation of 5-[3'-ethyl-5':6'-methylenedioxy-2':3'-dihydrobenzthiazolylidene - 2']-4-ethoxy - 1:1 - dicyano-1:3-pentadiene*

2 - acetylmethylene - 3 - ethyl - 5:6 - methylenedioxy-2:3-dihydrobenzthiazole (6.5 gm.) and ethyl toluene-p-sulphonate (7 gm.) were fused together with occasional agitation at 160° for 3½ hours. Ethyl alcohol (200 cc.) and ethoxymethylene malonitrile (4.5 gm.) were then added and the mixture warmed to obtain a clear solution. Triethylamine (7 cc.) was added and the whole refluxed for one hour on the water bath. On pouring the solution into a warm solution of potassium iodide (20 gm.) in water (400 cc.) a red-purple precipitate was obtained. This was filtered off, washed with water and extracted with benzene to yield the product as red-purple crystals, M. Pt. 280–281° (d), too insoluble to be recrystallised from ethyl alcohol.

EXAMPLE 21

*Preparation of 5-[3'-ethyl-4'-chlor-2':3'-dihydrobenzthiazolylidene-2']-4-ethoxy-1:1-dicyano-1:3-pentadiene*

2 - acetylmethylene - 3 - ethyl - 4 - chlor - 2:3 - dihydrobenzthiazole (12.5 gm.) and ethyl p-toluene sulphonate (14 gm.) were fused together at 140° C. for 3½ hours, with occasional shaking. The resulting solid was warmed with ethyl alcohol (200 cc.) and ethoxy methylene malonitrile (9 gm.) until a clear solution was obtained. Triethylamine (14 cc.) was added and the mixture refluxed on the water bath for an hour. The dye was precipitated by pouring into a solution of potassium iodide (20 gm.) in water (400 cc.). The solid was extracted with benzene, the benzene removed from the extract under reduced pressure. On recrystallising twice from ethyl alcohol (10 cc.) the dye was obtained as blue-violet crystals, M. Pt. 180° C.

Incorporated in a gelatino silver iodobromide photographic emulsion it imparted a band of sensitivity extending to 6200 Å., maximum indeterminate.

EXAMPLE 22

*Preparation of 5 - [3' - ethyl-2':3'-dihydro-4'–5'-benzbenzthiazolylidene - 2'] - 4 - methoxy - 1:1 - cyano-1:3-pentadiene*

2 - acetylmethylene - 3 - ethyl - 2:3 - dihydro - β - naphthathiazole (6.7 gm.) and methyl p-toluene sulphonate (7 gm.) were fused together on the steam bath for 5 hours with occasional shaking. The resulting solid was warmed with ethyl alcohol (100 cc.) and ethoxy methylene malonitrile (6 gm.) until complete solution was obtained. Triethylamine (7 cc.) was added and the mixture was refluxed on the water bath for an hour. The mixture, which already contained some solid, was well mixed with a solution of potassium iodide (20 gm.) in water (400 cc.). The solid was filtered off, extracted with benzene, the extract cooled and the dye crystals filtered off, M. Pt. 272° C.

Incorporated in a gelatino silver iodobromide photographic emulsion it imparted a band of sensitivity extending to 5900 Å. with a maximum 5600 Å.

EXAMPLE 23

*Preparation of ethyl 6-[3'-ethyl-2':3'-dihydro-5':6'-methylenedioxybenzthiazolylidene-2']-5 - ethoxy - 2 - cyano-2:4-hexadienoate*

2 - acetylmethylene - 3 - ethyl-5:6-methylenedioxy-2:3-dihydrobenzthiazole (6.5 gm.) and ethyl toluene-p-sulphonate (7 gm.) were fused together at 160° for 3½ hours, with occasional agitation. The resulting viscous mass was then dissolved in ethyl alcohol (200 cc.) and ethoxymethylene cyanacetic ethyl ester (5 gm.) added. Triethylamine (7 cc.) was run into the clear solution, the whole refluxed gently for one hour on a water bath and then poured into a solution of potassium iodide (20 gm.) in water (400 cc.). The precipitated crystals were filtered off, washed with water and dried. The product was then extracted with benzene, the extract taken to dryness and the residue purified by recrystallisation from ethyl alcohol by repeated boiling out. It consisted of minute purple rhombs, M. Pt. 258° (d).

Incorporated in a gelatino silver iodobromide photographic emulsion it imparted a band of sensitivity extending to 5900 Å., maximum indeterminate.

EXAMPLE 24

*Preparation of ethyl 6-[3'ethyl-5'-methyl-2':3'-dihydrobenzthiazolylidene - 2'] - 5 - ethoxy - 2-cyano-2:4-hexadienoate*

2 - acetylmethylene-3-ethyl-5-methyl-2:3-dihydrobenzthiazole (11.6 gm.) and ethyl p-toluene sulphonate (14 gm.) were fused together at 140° C. for 3½ hours with occasional shaking. The mixture was warmed with ethyl alcohol (200 cc.) and ethoxy methylene cyanacetic ethyl ester (10 gm.) until a clear solution was obtained. Triethylamine (14 cc.) was added and the mixture refluxed on the water bath for an hour. Upon pouring into a solution of potassium iodide (20 gm.) in water (400 cc.) crystals were deposited and were filtered off. The crystals were extracted with benzene, the benzene removed from the extract under reduced pressure and the residue cooled to precipitate the dye. Recrystallization from ethyl alcohol (20 cc.) gave red crystals melting at 189° C.

Incorporated in a gelatino silver iodobromide photographic emulsion it imparted a band of sensitivity extending to 5900 Å., maximum indeterminate.

EXAMPLE 25

*Preparation of ethyl 6-[3'-ethyl-2':3'-dihydro-4':5'-benzbenzthiazolylidene - 2'] - 5-methoxy-2-cyano-2:4-hexadienoate*

2 - acetylmethylene - 3-ethyl-2:3-dihydro-β-naphthathiazole (6.7 gm.) and methyl p-toluene sulphonate (7 gm.) were fused together on the steam bath for 5 hours with occasional shaking. The resulting solid was warmed with ethyl alcohol (100 cc.) and ethoxy methylene cyanacetic ethyl ester (8.5 gm.) until a clear solution was obtained. Triethylamine (7 cc.) was added and the mixture refluxed on the water bath for an hour. On pouring into a solution of potassium iodide (20 gm.) in water (400 cc.), crystals were deposited and were filtered off. The solid was extracted with benzene, the benzene removed from the extract under reduced pressure and the residue cooled to precipitate the dye. Recrystallisation from ethyl alcohol gave red crystals with a green reflex, melting at 194° C.

Incorporated in a gelatino silver iodobromide photographic emulsion it imparted a band of sensitivity extending to 6300 Å. with a maximum at 5900 Å.

What we claim is:

1. Dyestuffs of the general formula:

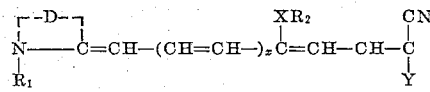

where $R_1$ and $R_2$ are each selected from the class consisting of alkyl groups containing up to 4 carbon atoms and the benzyl group D is the residue of a group selected from the class consisting of thiazole, oxazole, selenazole, benzthiazole, benzoxazole, benzselenazole, naphthathiazole, naphthoxazole and naphthselenazole groups, X is selected from the class consisting of oxygen and sulphur atoms, Y is selected from the class consisting of —CN and —COOR₃ groups where $R_3$ is selected from the class consisting of alkyl groups containing up to 4 carbon atoms and the benzyl group, and $x$ is selected from nought and one.

2. The dyestuff ethyl 6-[3'-ethyl-2':3'-dihydro-4':5'-benzbenzthiazolylidene - 2'] - 5-ethoxy-2-cyano-2:4-hexadienoate having the structural formula:

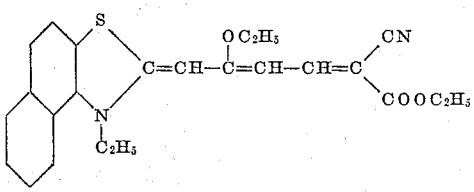

3. The dyestuff ethyl 6-[-3'-ethyl-2':3'-dihydrobenzthiazolylidene-2']-5-ethylthio-2-cyano-2:4 - hexadienoate having the structural formula:

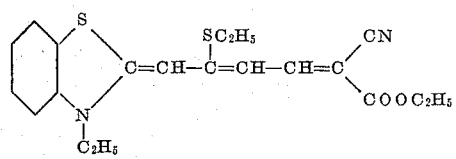

4. The dyestuff ethyl 6-[3'-ethyl-2':3'-dihydro-4':5'-benzbenzthiazolylidene-2']-5-methoxy-2-cyano-2:4 - hexadienoate having the structural formula:

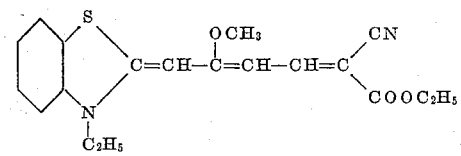

(References on following page)

References Cited in the file of this patent

UNITED STATES PATENTS

| Number | Name | Date |
|---|---|---|
| 2,107,379 | Koslowsky | Feb. 8, 1938 |
| 2,158,287 | Koenig | May 16, 1939 |
| 2,166,736 | White et al. | July 18, 1939 |
| 2,185,798 | Stevens | Jan. 2, 1940 |
| 2,263,749 | White et al. | Nov. 25, 1941 |
| 2,269,234 | Sprague | Jan. 6, 1942 |
| 2,319,547 | Kendall et al. | May 18, 1943 |
| 2,320,654 | Riester | June 1, 1943 |
| 2,322,015 | Hamer et al. | June 15, 1943 |
| 2,338,782 | Riester | Jan. 11, 1944 |
| 2,340,882 | Kendall | Feb. 8, 1944 |
| 2,353,164 | Kendall et al. | July 11, 1944 |
| 2,443,136 | Heimbach | June 8, 1948 |
| 2,511,210 | Kendall et al. | June 13, 1950 |
| 2,557,806 | Van de Strate | June 19, 1951 |
| 2,573,555 | Edwards | Oct. 30, 1951 |
| 2,600,380 | Edwards | June 17, 1952 |
| 2,603,642 | Edwards | July 15, 1952 |

FOREIGN PATENTS

| Number | Country | Date |
|---|---|---|
| 610,569 | Great Britain | Oct. 18, 1948 |
| 806,854 | France | Dec. 28, 1936 |

OTHER REFERENCES

Keyes, Abstract application No. 620,164, 647 O. G., pp. 1278–79, June 26, 1951.

Chemical Abstracts 16:3101 (Abstract of Brit. Med. Journal, 1922, I, 514–515).

Chemical Abstracts 19:530 (Abstract of Proc. Roy. Soc., London, 96 B, 317–333, 1924).